(12) United States Patent
Balthes et al.

(10) Patent No.: US 10,113,460 B2
(45) Date of Patent: Oct. 30, 2018

(54) METHOD FOR ADJUSTING THE TEMPERATURE OF AN EXHAUST GAS AFTERTREATMENT DEVICE

(71) Applicant: Daimler AG, Stuttgart (DE)

(72) Inventors: Ortwin Balthes, Sachsenheim (DE);
Berthold Keppeler, Owen (DE);
Siegfried Mueller, Ingersheim (DE);
Thorsten Woog, Stuttgart (DE)

(73) Assignee: Daimler AG, Stuttgart (DE)

( * ) Notice: Subject to any disclaimer, the term of this patent is extended or adjusted under 35 U.S.C. 154(b) by 33 days.

(21) Appl. No.: 15/115,557

(22) PCT Filed: Jan. 13, 2015

(86) PCT No.: PCT/EP2015/000041
§ 371 (c)(1),
(2) Date: Jul. 29, 2016

(87) PCT Pub. No.: WO2015/113732
PCT Pub. Date: Aug. 6, 2015

(65) Prior Publication Data
US 2017/0167342 A1    Jun. 15, 2017

(30) Foreign Application Priority Data

Feb. 1, 2014 (DE) .................. 10 2014 001 418

(51) Int. Cl.
*F01N 3/00* (2006.01)
*F01N 3/20* (2006.01)
(Continued)

(52) U.S. Cl.
CPC ........... *F01N 3/2013* (2013.01); *F01N 3/103* (2013.01); *F01N 3/2066* (2013.01); *F01N 11/002* (2013.01); *F01N 2610/1453* (2013.01)

(58) Field of Classification Search
USPC ......... 60/273, 284, 285, 286, 295, 300, 301, 60/303
See application file for complete search history.

(56) References Cited

U.S. PATENT DOCUMENTS 6,122,910 A * 9/2000 Hoshi ................... F01N 3/0835
60/285
7,818,960 B2 * 10/2010 Gonze ................... F01N 3/2013
60/284
(Continued)

FOREIGN PATENT DOCUMENTS

DE    10 2005 013 707 A1    9/2006
DE    10 2008 013 777 A1    10/2008
DE    10 2010 035 007 A1    2/2012

OTHER PUBLICATIONS

PCT/EP2015/000041, International Search Report dated Mar. 25, 2015 (Two (2) pages).
(Continued)

*Primary Examiner* — Binh Q Tran
(74) *Attorney, Agent, or Firm* — Crowell & Moring LLP

(57) ABSTRACT

A method for adjusting the temperature of an exhaust gas aftertreatment device is disclosed. A first characteristic temperature value for an oxidative carbon monoxide conversion and a second characteristic temperature value for an oxidative hydrocarbon conversion are assigned to an oxidation catalytic converter, and a third characteristic temperature value for a reductive NOx conversion is assigned to an SCR catalytic converter. Different respective values for injection parameters of injection processes for fuel injections into combustion chambers of the internal combustion engine and/or the heating output of an electric heating element are set upon reaching the first and the second characteristic temperature values for the temperature of the oxidation catalytic converter and upon reaching the third characteristic
(Continued)

temperature value for the temperature of the SCR catalytic converter.

9 Claims, 3 Drawing Sheets

(51) Int. Cl.
*F01N 3/10* (2006.01)
*F01N 11/00* (2006.01)

(56) References Cited

U.S. PATENT DOCUMENTS

| | | | |
|---|---|---|---|
| 8,607,549 B2* | 12/2013 | Kong | F02D 41/029 |
| | | | 60/286 |
| 2008/0295493 A1* | 12/2008 | Applegate | B60K 6/485 |
| | | | 60/286 |
| 2012/0324868 A1* | 12/2012 | Kim | F01N 3/0835 |
| | | | 60/274 |
| 2014/0360162 A1* | 12/2014 | Gonze | F01N 3/2013 |
| | | | 60/274 |

OTHER PUBLICATIONS

German Search Report issued in German counterpart application No. 10 2014 001 418.5 dated Jun. 12, 2014, with Statement of Relevancy (Eight (8) pages).

* cited by examiner

METHOD FOR ADJUSTING THE TEMPERATURE OF AN EXHAUST GAS AFTERTREATMENT DEVICE

BACKGROUND AND SUMMARY OF THE INVENTION

The invention relates to a method for adjusting the temperature of an exhaust gas aftertreatment device connected to an internal combustion engine.

DE 10 2005 013 707 A1 discloses a method for adjusting the temperature of an exhaust gas aftertreatment device connected to an internal combustion engine, having an electric heating element, an oxidation catalytic converter connected behind the heating element, and a selective catalytic reduction (SCR) catalytic converter connected behind the oxidation catalytic converter, wherein, after the internal combustion engine is started, current is fed to the heating element, after which an enrichment of the exhaust gas with combustible components is performed upstream of the oxidation catalytic converter. The enrichment of the exhaust gas with combustible components can be performed in this case by a corresponding adjustment of injection parameters of fuel injection processes, particularly if the oxidation catalytic converter has exceeded a predetermined temperature threshold. Likewise, the heating power of the heating element can be adjusted according to temperatures of the catalysts. In this way, it is possible to rapidly heat the catalysts to their operating temperature—for example when the internal combustion engine is started from cold.

The problem addressed by the invention is that of providing a further-improved method for adjusting the temperature of a corresponding exhaust gas aftertreatment device.

This problem is addressed by a method of the present invention.

In the method, temperature values for a current temperature of the oxidation catalytic converter and the SCR catalytic converter are determined continuously, and depending on the determined temperature values, injection parameters of injection processes for fuel injections into the combustion chambers of the internal combustion engine, and a heat output of the heating element, are adjusted. Here the oxidation catalytic converter and the SCR catalytic converter are each assigned a characteristic temperature value which is linked to a predetermined conversion threshold. According to the invention, a first characteristic temperature value for an oxidative carbon monoxide conversion, and a second characteristic temperature value for an oxidative hydrocarbon conversion, are assigned to the oxidation catalytic converter, and a third characteristic temperature value for a reductive nitrogen oxide conversion is assigned to the SCR catalytic converter, wherein when the first and second characteristic temperature values for the temperature of the oxidation catalytic converter are reached, and when the third characteristic temperature value for the temperature of the SCR are reached, in each case different values for the injection parameters and/or the heating power of the heating element are adjusted. This approach takes into account the fact that a certain degree of the catalytic activity of the catalysts for different types of catalyzed reactions is achieved at different temperatures. Therefore, the approach according to the invention enables a particularly effective thermal management of the exhaust gas aftertreatment device by considering these reactions. The catalysts can be brought from low temperatures, on the one hand, particularly quickly and efficiently to their respective operating temperatures, and on the other hand in adverse operating conditions can be particularly efficiently protected from cooling down to below their respective operating temperatures.

By setting injection parameters for the fuel injection according to the corresponding characteristic temperature values for the carbon monoxide and hydrocarbon conversion rate of the oxidation catalytic converter, which particularly varies at low temperatures, it is then possible to produce fractions of carbon monoxide (CO) and hydrocarbon (HC) in the exhaust gas which are optimized as a result of their oxidation for effective heat release. The heat energy of the heating element can then, on this basis, be adjusted to thereby enable an efficiency-optimized division of the heat energy into the oxidation catalytic converter and the heat energy released by the heating element. Moreover, an optionally modified setting of the injection parameters, additionally according to the third characteristic temperature value for the temperature of the SCR catalytic converter, for a predetermined conversion threshold of, for example, 50%, makes it possible for the SCR catalytic converter to quickly reach its level of catalytic efficacy with respect to a reductive conversion of nitrogen oxides (NOx) while preventing a drop below this temperature value.

In one embodiment of the method, a lower value is used for the first characteristic temperature value for an oxidative hydrocarbon conversion of the oxidation catalytic converter than for the second characteristic temperature value for oxidative carbon monoxide conversion thereof. This approach takes into account the fact that the oxidation catalytic converter typically reaches a predetermined value of, for example, 50% for a catalytic oxidative conversion of carbon monoxide at lower temperatures than for the same degree of catalytic oxidative conversion of hydrocarbon.

In a further embodiment of the method, higher values are used for the first characteristic temperature value and/or for the second characteristic temperature value and/or the third characteristic temperature value for increasing temperatures than are used for decreasing temperatures. The inventors have surprisingly found that, with respect to a particular conversion rate of, for example, 50%, a temperature hysteresis occurs such that as the temperature increases, a jump in the catalytic activity (so-called light-off) occurs at a higher temperature of the respective catalyst, and an extinction of the catalytic activity occurs with decreasing temperature (so-called light-out). By taking this phenomenon into account in the measures provided for a thermal management operation of the heating element and/or a modification of the injection parameters, the invention therefore enables a more efficient use of energy.

In a further embodiment of the method, a state of aging of the oxidation catalytic converter and/or the SCR catalytic converter is/are determined and the first and/or second and/or third characteristic temperature values are changed according to the determined state of aging in each case. In this way, age-related deterioration of the catalytic activity of the catalysts can be taken into account, particularly in the operation of the electric heating element, and largely compensated for. The respective aging states can be determined, by way of example, from time to time by determining current conversion values and comparing these to stored comparative conversion values. In addition, the thermal load of the catalysts can be detected, and this can be incorporated into an aging factor.

In a further embodiment of the method, for the heating of the oxidation catalytic converter and/or the SCR catalytic converter, a first heat energy is released as a result of operation of the heating element and, according to the set injection parameters, a second heat energy is released as a result of a late timing of fuel burnt in the combustion chambers of the internal combustion engine, and a third heat energy is released at the oxidation catalytic converter as a result of a post-combustion of incompletely combusted fuel discharged by the internal combustion engine, wherein a relative fraction of each heat energy in the total heat energy resulting from the released heat energy is adjusted as a function of the determined temperature values and the first characteristic temperature value and/or the second characteristic temperature value and/or the third characteristic temperature value. This enables a particularly efficient thermal management of the catalysts.

It has been found that this is particularly the case if, in a further embodiment of the invention, the total heat energy is only applied by the first heat energy and the second heat energy when, for the current temperature of the oxidation catalytic converter, temperature values are determined to be below the first characteristic temperature value. Furthermore, it has been found to be particularly effective if the relative fraction of the first heat energy is adjusted to about 50% in cases where, for the current temperature of the oxidation catalytic converter, the temperature values are determined to be below the first characteristic temperature value.

Furthermore, it is particularly advantageous if, in a further embodiment of the invention, the relative fraction of the first heat energy is adjusted to less than about 30% in cases where current temperature values for the temperature of the oxidation catalytic converter are determined to be above the first characteristic temperature value, and the temperature values for the current temperature of the SCR catalytic converter are determined to be below the third characteristic temperature value.

Finally, it has proven to be particularly advantageous, in a further embodiment of the invention, that if temperature values are determined to be below the first characteristic temperature value for the current temperature of the oxidation catalytic converter, the total heat energy is adjusted lower than if temperature values for the oxidation catalytic converter are determined to be above the second characteristic temperature value and if temperature values for the SCR catalytic converter are determined to be below the third characteristic temperature value.

Advantageous embodiments of the invention are illustrated in the drawings and are described below. The features named above explained further below can be used not only in the specified combinations of features, but also in any other combination or alone, without departing from the scope of the present invention.

DETAILED DESCRIPTION OF THE DRAWINGS

Figure 1:
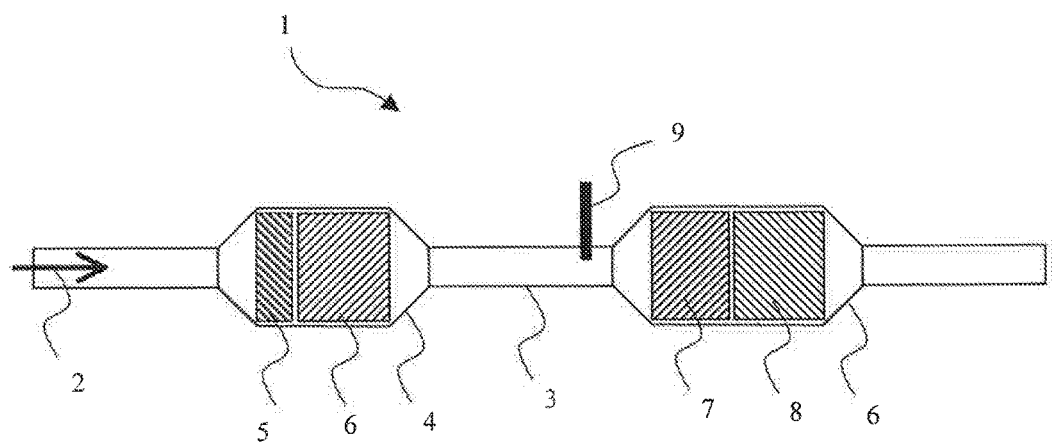
FIG. 1 shows a schematic block diagram of an exhaust gas treatment device of an internal combustion engine.

FIG. 1 shows, in a rough schematic, an exhaust gas treatment device 1 which is connected to a combustion engine of a motor vehicle, which is not shown. The internal combustion engine in this case is designed as a compression ignition, direct injection diesel engine. However, the design could also be a lean operation-capable spark ignition gasoline engine. Exhaust gas of the internal combustion engine flows in the direction of flow indicated by an arrow 2, into an exhaust line 3. An electric heating element 5, an oxidation catalytic converter 6, a particulate filter 7 and an SCR catalytic converter 8 are arranged, one after the other, in the exhaust gas flow direction in the exhaust line 3. Furthermore, a feed device 9 is included for a reducing agent which is selective for the reduction of nitrogen oxide, in particular aqueous urea solution. The feed device 9 in the present case is arranged on the input end of the particle filter 7. This is particularly advantageous for the particle filter 7, which in the present case is equipped with an SCR catalytic converter coating. In the case of a particle filter 7 without such a coating, the feed device 9 is arranged between the particle filter 7 and the SCR catalytic converter 8.

The electric heating element 5 is disposed immediately upstream of the oxidation catalytic converter 6, and arranged together with the same in a shared housing 4. The particle filter 7 and the SCR catalytic converter 8 in the present case are likewise arranged in a shared housing denoted by the numeral 6. However, an arrangement in separate housings is also possible.

The oxidation catalytic converter 6 is preferably designed as a so-called diesel oxidation catalytic converter with a honeycomb construction. A proposed catalytic oxidation coating of the flow channels may also have a three-way catalyst function. The oxidation catalytic converter 6 can have a ceramic body or a metal foil support body as a support. The electric heating element is preferably designed as a metal foil support body (a so-called E-cat), which can likewise comprise an oxidative catalytic coating.

The particle filter 7 is preferably formed as a filter unit with a honeycomb structure. Preferably, there is a catalytic coating for the particle filter 7, in particular an SCR catalyst material. The SCR catalyst material is capable of catalyzing a selective, continuous NOx reduction under oxidizing conditions, by means of stored and/or supplied ammonia (NH3) as the selective NOx reducing agent. An iron- or copper-containing zeolite is preferred as the catalyst material. The SCR catalyst material can be situated in this case on the raw gas end and/or on the clean gas end of the filter-active surfaces of the particle filter 7. In the preferred design of the particle filter 7 as a filter with walls that provide the passage of air flow, with a honeycomb structure, the coating with the corresponding SCR catalyst material is preferably situated on the channel walls, which are exposed to the raw gas. In this case in particular, it can be advantageous to only configure the SCR catalyst coating in sections of the inlet end or the outlet end on the porous channel walls of the particle filter 7.

The SCR catalytic converter 8 configured downstream of the particle filter 7 is likewise preferably also designed as a coated honeycomb body. Analogously to the SCR catalyst material coating the particle filter 7, the coating is capable of selective reduction of NOx using NH3. In this case, an embodiment with the ability to store NH3 is preferred. In order to prevent a release of NH3 into the surroundings, for example as a result of a thermal desorption or as a result of load-related slip, a further oxidation catalytic converter can be arranged downstream of the SCR catalytic converter unit 8 as a so-called lock-catalyst, which is not shown separately.

For the operation of the diesel engine and the exhaust gas treatment device 1, various sensors are included in the exhaust pipe 3, which is not shown in detail for clarity's sake. In particular, temperature sensors are included, which are able to detect temperature values for the heating element 5, the oxidation catalytic converter 6, the particle filter 7, and the SCR catalytic converter 8 directly. However, temperature sensors can also be included which can detect temperature values correlated with the temperatures of these components, from which the actual temperatures of these components can be determined.

The signals from the sensors can be processed by a control device which is not shown, which based on the signals and stored characteristic curves and maps is able to determine operating states of the diesel engine, and to set the same by activating actuators in a controlled and/or regulated manner. In particular, fuel injection parameters such as the number of fuel injections per operating cycle, and the injection pressure, duration and timing thereof, can be set. Furthermore, an electric heat energy supplied to the heating element 5 can preferably be set in a controlled and/or regulated manner by means of the control device.

Hereinafter, a method for the operation of the diesel engine and the heating element 5, for the purpose of adjusting the temperature of the exhaust gas treatment device 1, is explained in more detail with reference to the other FIGS. 2-7. The aim of the method is to bring the catalytically active components of the exhaust gas treatment device 1, starting from low temperatures, to their operating temperature, and/or to maintain them at their operating temperature. To explain the relevant temperature conditions, reference is first made to a diagram displayed in FIG. 2.

Figure 2:
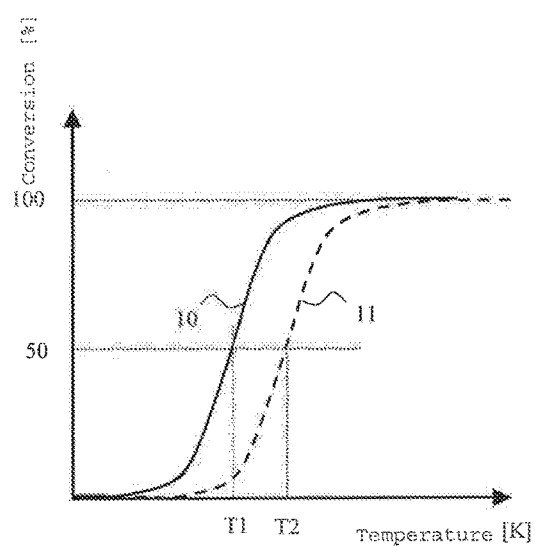
FIG. 2 shows a schematic temperature conversion curve for the relationship between conversion rates of a catalyst of the exhaust gas treatment device according to FIG. 1.

The diagram of FIG. 2 schematically shows degrees of catalytic conversion of the oxidation catalytic converter 6 according to the temperature thereof. A curve 10 represents a temperature profile of an oxidative carbon monoxide conversion, and a curve 11 represents a temperature profile of an oxidative hydrocarbon conversion. As illustrated, the conversion rates are low at low temperatures due to lack of catalytic activity. With increasing temperature, the conversion rates also begin to increase, and reach values at high temperatures of 100%. At a first characteristic temperature T1 and a second characteristic temperature T2, degrees of conversion of 50% can be achieved for a carbon monoxide and hydrocarbon conversion. Only by way of example, the following proceeds from the assumption that the operating temperature of the oxidation catalytic converter 6, with respect to an oxidative carbon monoxide conversion and hydrocarbon conversion, is above these characteristic temperatures T1, T2. It should be understood that, for a definition of the operating temperature, in principle different values for the degree of conversion, such as 80% can be used, resulting in accordingly higher characteristic temperatures T1, T2. However, this does not change the basic relationships. In the present case, the characteristic temperature values T1, T2 are assigned a conversion threshold, which is only given as 50% by way of example.

As can be seen in the diagram in FIG. 2, the first characteristic temperature T1 for an oxidative hydrocarbon conversion is lower than the second characteristic temperature T2 for an oxidative carbon monoxide conversion. The inventors have found that such behavior is typical of a diesel oxidation catalytic converter, as is preferably under consideration here. Depending on the design, age and condition of the oxidation catalytic converter 6, values of about 130° C. to 180° C. for the first characteristic temperature T1, and values of about 160° C. to 210° C. for the second characteristic temperature T2, can be considered typical.

Preferably, the relevant oxidation catalytic converter characteristics shown in the diagram in FIG. 2 are stored in the control unit of the engine. Analogously, temperature/conversion characteristic profiles are included for a reductive NOx conversion of the SCR catalytic converter 8 and for the SCR catalytic converter coating of the particle filter 7. Below, a temperature which is assigned to a prespecified NOx conversion threshold of the SCR catalytic converter 8 of, by way of example, 50% is termed the third characteristic temperature value T3. Depending on the design, age and condition of the SCR catalytic converter 8, values of about 170° C. to 210° C. can be regarded as typical. No representation of the corresponding characteristic curves has been provided in a separate diagram, so as to avoid unnecessary detail.

Figure 3:
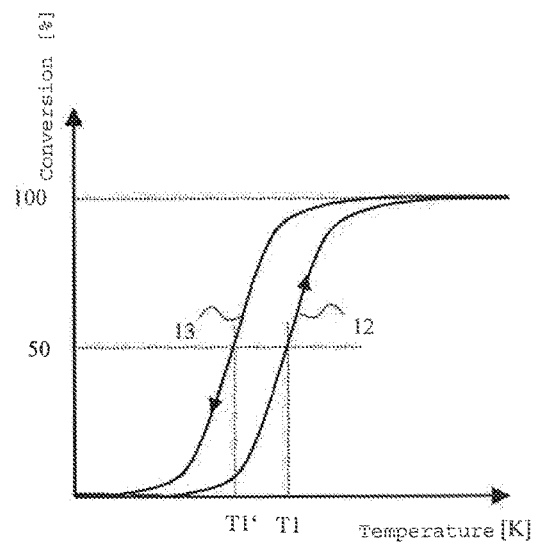
FIG. 3 shows a schematically illustrated temperature hysteresis for the relationship of a catalytic conversion at rising and falling temperatures.
Figure 4:
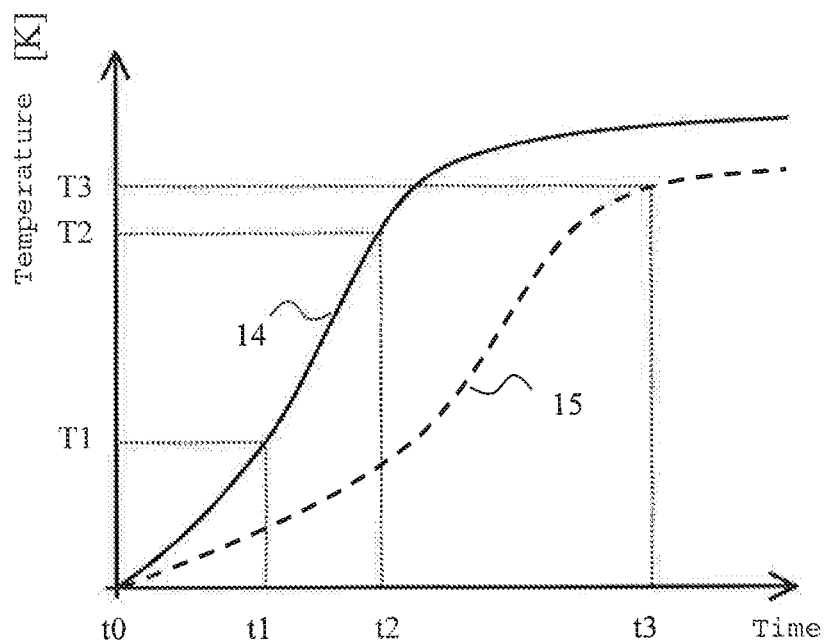
FIG. 4 shows a schematic temperature conversion profile over time for the heating of the oxidation catalytic converter and the SCR catalytic converter of the exhaust gas treatment device according to FIG. 1.

As was found by the inventors, however, the characteristic temperature values T1, T2, T3, which can be assigned to each prespecified conversion threshold, are different depending on whether rising or falling temperatures prevail. In the diagram shown in FIG. 3, this is represented by way of example for the oxidative conversion of carbon monoxide by the oxidation catalytic converter 6 by a temperature hysteresis having a first branch of the curve 12 for rising temperatures, and a second branch of the curve 13 for decreasing temperatures. In the following, as shown in the diagram of FIG. 3, the first characteristic temperature value, assigned to a prespecified conversion threshold of 50%, by way of example, for the oxidative conversion of carbon monoxide for rising temperatures, is indicated as T1, analogously to the diagram of FIG. 2. The first characteristic temperature value for the oxidative conversion of carbon monoxide for decreasing temperatures is denoted by T1'. Accordingly, in the following, the second characteristic temperature value for an oxidative hydrocarbon conversion by the oxidation catalytic converter 6 is indicated as T2 for situations of rising temperatures and with T2' for situations of falling temperatures. Analogously, in the following, the third characteristic temperature value for a reductive nitrogen oxide conversion by the oxidation catalytic converter 8/SCR catalytic converter coating of the particle filter 7 is indicated as T3 for situations of rising temperatures, and with T3' for situations of falling temperatures.

Below, advantageous measures for a thermal management of the catalytically active components of the exhaust gas treatment device 1 are explained. The following addresses, with reference to a time diagram shown as an example in FIG. 4, the case of a warming-up of the diesel engine, wherein the oxidation catalytic converter 6 and the SCR catalytic converter 8 initially have temperatures below their respective operating temperatures.

Figure 7:
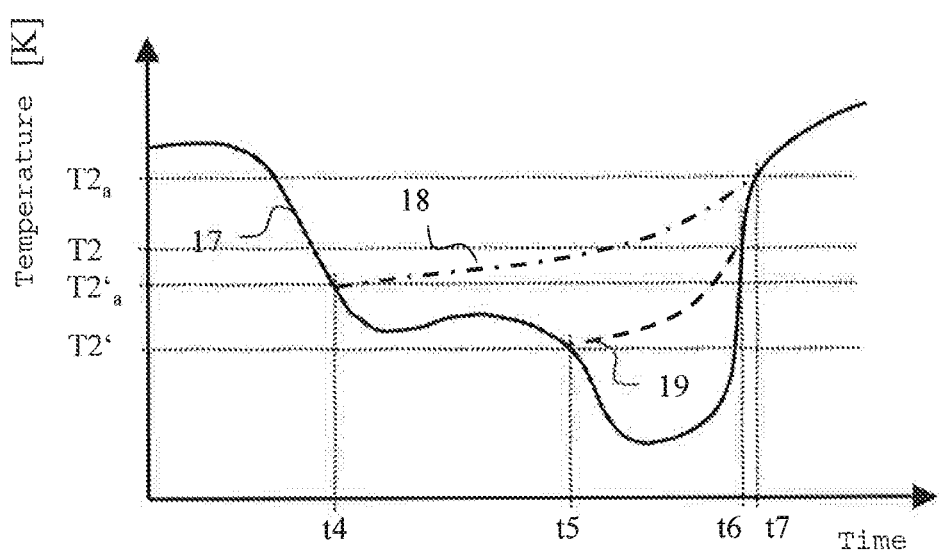
FIG. 7 shows a diagram with schematically illustrated temperature profiles with and without operation of the electric heating element of the exhaust gas treatment device according to FIG. 1.

The time diagram in FIG. 7 shows profiles over time of the warming-up of the oxidation catalytic converter 6 and the SCR catalytic converter 8. A curve 14 represents a temperature profile of the oxidation catalytic converter 6, and a curve 15 represents a heating profile of the SCR catalytic converter 8. Because the SCR catalytic converter 8 is arranged further from the engine than the oxidation catalytic converter 6 in the exhaust gas treatment device 1, as is shown the SCR catalytic converter 8 warms up later, and typically slower, than the oxidation catalytic converter 6.

In order to achieve a rapid warm-up, different measures are taken—divided into phases which proceed one after the other. Proceeding from an engine start occurring at time point t0, current is initially fed in a first phase to the electrical heating element 5, and the fuel injection parameters of the diesel engine compared to an optimal consumption setting are modified in such a manner that the center of combustion mass is shifted to a late point. The center of combustion mass in this case means the position of the pistons of the diesel engine, measured in degrees crank angle (° CA) with respect to the top dead center (TDC) in the combustion stroke, in which 50% of the fuel injected into the respective cylinder, particularly by the main fuel injection, has been combusted, producing torque. To this end, the start of the injection for a main fuel injection is shifted to a few degrees after top dead center of the compression stroke. Typical values for the start of the main fuel injection are about 2° CA to about 10° CA. In this case, the fuel injection volume is also split into two immediately sequential injections—specifically a first main fuel injection and a subsequent post-injection during the combustion. In this way, the center of combustion mass is shifted in a range of preferably from 20° CA to 50° CA. In the process, an at least approximately complete combustion of the injected fuel preferably occurs in the combustion chambers of the diesel engine. Accordingly, the emissions of carbon monoxide and hydrocarbons are very low.

A heat energy released by the electric heating element as a result of current being fed to the same is referred to as the first heat energy P1. The late point of the center of combustion mass degrades the mechanical efficiency of the diesel engine in comparison with operation which is optimal for consumption, and the discharged exhaust gas has a correspondingly increased temperature. Below, a heat energy released as a result, which is greater than that released during operation of the diesel engine with optimal consumption is referred to as the second heat energy P2.

The aforementioned measures undertaken at the start of the engine remain in-place until the oxidation catalytic converter 6 at time point t1 has reached a temperature corresponding to the first characteristic temperature T1. Starting at this time point t1, in a second operating phase, with the main fuel injection still shifted to a late point, and with current still being fed to the electrical heating element 5, a fuel post-injection is additionally carried out at a time point which is early enough that the post-injected fuel is no longer completely, but predominantly, combusted, likewise in the combustion chambers of the diesel engine, in such a manner that there is a significantly greater emission of carbon monoxide compared to operation which is optimal for consumption. The emission of hydrocarbons, however, remains low. The corresponding concentration of hydrocarbons in the exhaust gas is thus more-or-less significantly less than that of carbon monoxide. The early, predominantly combusted post-injection of fuel typically starts at a crank angle range of about 20° CA to 40° CA after the start of the main injection. This results in a further increase in the second heat energy P2 released by the diesel engine. A further heating results from an exothermic oxidation of the emitted carbon monoxide at the oxidation catalytic converter 6. This is made possible because the oxidation catalytic converter 6 has reached a temperature higher than the first characteristic temperature T1. A heat energy release at the oxidation catalytic converter 6 by the exothermic oxidation of the incompletely burned fuel emitted by the diesel engine in this case in the form of carbon monoxide is referred to below as the third heat energy P3.

The conditions of the second phase of operation are maintained until time point t2, at which the oxidation catalytic converter 6 has reached a temperature which corresponds to the second characteristic temperature value T2. Typically, at this point, the SCR catalytic converter 8 is still below its operating temperature—i.e. it has a temperature below the third characteristic temperature value T3. Starting at time point t2, in a third operating phase, the fuel injection parameters are modified in such a manner that instead of the early post-injection of fuel participating in the combustion, a late post-injection of fuel occurs with no combustion. Typically, the late post-injection takes place in the range of 80 to 160° CA. However, it is also possible to perform more than one late post-injection—for example two or three late post-injections. Preferably, a retardation of the timing of the main injection is maintained, as is the supply of current to the electric heating element 5. As a result of further retarded post-injection, the exhaust gas is enriched with hydrocarbons as unburned fuel components. The hydrocarbons, however, can be oxidized at the oxidation catalytic converter 6 exothermically. For this reason, the third heat energy P3 increases while the second heat energy P2 typically decreases. Overall, this achieves a further heating of the oxidation catalytic converter 6 and the SCR catalytic converter 8.

If the operating temperature of the SCR catalytic converter 8 is reached at time point t3—that is, the characteristic third temperature value T3 thereof is reached or exceeded—the heating measures are preferably terminated. As such, the injection parameters are converted to values for a combustion which is at least nearly optimal for consumption, and the supply of current to the electric heating element 5 is ended. Alternatively, the current supply to the heating element 5 can also be maintained for a prespecified time for auxiliary heating, preferably with a reduced heat energy P1. Preferably, a dosing of aqueous urea solution is performed as needed, at the least when the operating temperature of the SCR catalytic converter 8 is reached, via the feed device 9, thereby enabling a substantial removal of nitrogen oxides from the exhaust. The dosing is maintained as long as the SCR catalytic converter 8 is operational—that is, has a temperature which is above the third characteristic temperature value T3 and/or T3'. However, an at least intermittent dosing of urea can be implemented even at temperatures of the SCR catalytic converter 8 below its operating temperature, in order to store ammonia in the SCR catalytic converter 8. For this purpose, the release of the dose and/or an operation of the feed device 9 can be made dependent on a minimum temperature of about 155° C. to 185° C. being achieved at the feed device 9.

Figure 5:
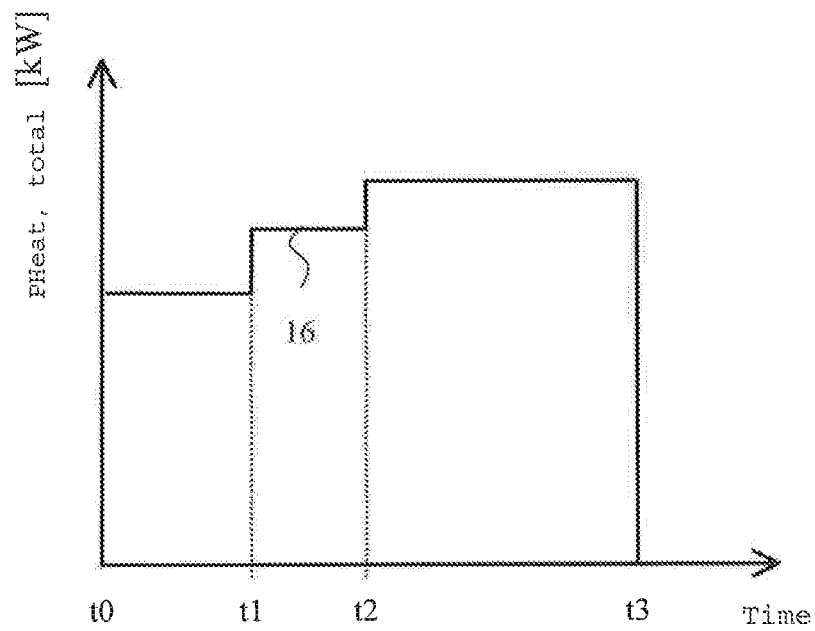
FIG. 5 shows a schematic illustrated profile over time for the total released heat used for heating the exhaust gas treatment device according to FIG. 1.

Preferably, the total released heat energy increases in the successively run phases of operation, which is illustrated by a time diagram shown in FIG. 5. The figure schematically shows the profile over time of the total released heat energy PHeat, total=P1+P2+P3.

Figure 6:
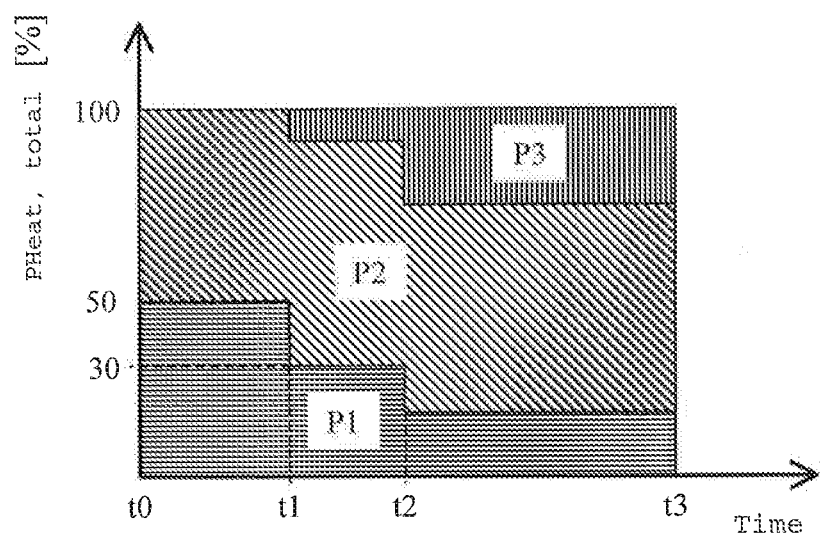
FIG. 6 shows a diagram with a schematically illustrated profile over time of the total released heat for each heating measure in relation to the total released heat, according to FIG. 5.

The contribution of a heat energy P1, P2, P3 in each individual phase of operation is shown by the diagram illustrated in FIG. 6 in relation to the total released heat energy PHeat, total. In this figure, the relative fractions of the heat energies P1, P2, P3 are normalized to the total released heat energy PHeat, total, set to 100%, by differently marked areas. As shown, for the temperature of the oxidation catalytic converter 6 at time point t1, approximately equal fractions of the respective heat energies P1 and P2, each of approximately 50% relative to the total released heat energy PHeat, total result from the adjustment of the injection parameters and the supply of current to the electric heating element 5 after the engine is started at time point T1. In the second operating phase in the interval from t1 to t2, the fraction of the first heat energy P1 is preferably about 30%. The fraction of the second heat energy P2 is then greater than 50%, preferably about 60%. In the subsequent third phase of operation before the third characteristic temperature value T3 for the temperature of the SCR catalytic converter 8 is reached, the relative fraction of the first heat energy P1 is preferably only about 17%, while the fraction of the third heat energy P3 is about 25% or more.

If a cooling of the exhaust gas treatment device 1 occurs, proceeding from an operational oxidation catalytic converter 6 and an operational SCR catalytic converter 8, in such a manner that the oxidation catalytic converter 6 and/or the SCR catalytic converter 8 fall below temperatures which correspond to the second characteristic temperature value T2', the first characteristic temperature value T1', or the third characteristic temperature value T3', then the measures described above are preferably reactivated in an analogous manner corresponding to the above temperature conditions. However, it can also be that, upon decreasing temperatures and temperature dropping below the second characteristic temperature value T2' for the temperature of the oxidation catalytic converter 6, initially current is fed to the electric heating element 5 only. In this case, it is particularly possible to dispense with further heating measures, based on altering the injection parameters, if the temperature of the SCR catalytic converter 8 is not below the third characteristic temperature value T3'.

If the temperature of the SCR catalytic converter 8 drops below the third characteristic temperature value T3', the injection parameters are preferably adjusted to correspond to a late non-burning post-injection, unless the oxidation catalytic converter 6 is still at a temperature above the second characteristic temperature value T2'. In addition, the center of combustion mass can be shifted to a late point. If the temperature of the oxidation catalytic converter 6 drops further, such that the second characteristic temperature value T2' has not yet dropped below the first characteristic temperature value T1', then a switch is made to an early, combusting post-injection rather than the late, non-combusting post-injection. In addition, current is preferably fed to the electrical heating element 5.

The described approach makes it possible to bring the exhaust gas treatment device 1 rapidly and efficiently to operating temperature, and/or to maintain the same at operating temperature, and thus to quickly reach a comprehensive exhaust scrubbing, and/or maintain the same even under unfavorable conditions. A further improvement can be achieved by a state of aging of the oxidation catalytic converter and/or the SCR catalytic converter being determined, and the first and/or second and/or the third characteristic temperature value being modified according to the aging state determined in each case. It is therefore possible to prevent a deterioration in the cleaning action of the exhaust gas treatment device 1 as a result of an increase in the characteristic temperature values, which typically occurs with the passage of time. Both the characteristic temperature values T1, T2, T3 for rising temperatures, and the characteristic temperature values T1', T2', T3' for falling temperatures are determined by measurement or by calculation either continuously or from time to time, and a potential age-related increase in these values is taken into account with the heating measures performed. A corresponding procedure is illustrated with reference to a diagram shown in FIG. 7.

The time diagram in FIG. 7 shows a curve 17 of a temperature profile over time of the oxidation catalytic converter 6 during driving operation with a driving cycle shown by way of example, wherein no separate measures have been taken to adjust the temperature of the oxidation catalytic converter 6. Due to the prevailing engine operating conditions, the temperature of the oxidation catalytic converter 6 initially decreases starting at temperatures above the second characteristic temperature value T2, and then rises again later. Thus, the oxidation catalytic converter 6 is catalytically inactive for a certain period of time, at least with respect to a hydrocarbon oxidation. This can be prevented by supplying current to the heating element 5, as shown by the dashed lines and/or the dashed curve branches 18 and 19, respectively. Here, the curve branch 18 indicates an operation of the heating element 5 with an aged oxidation catalytic converter 8, and the curve branch 19 indicates the operation of the heating element 5 with an unaged oxidation catalytic converter 8. In this case, relationships are predominantly shown in which the second characteristic temperature value for falling temperatures rises from a temperature T2' with an unaged oxidation catalytic converter 6 to the temperature with aging, indicated as T2'. Analogously, due to aging, the second characteristic temperature value for rising temperatures, has risen from a temperature T2 for the unaged state of the oxidation catalytic converter 6 to the temperature indicated as T2a.

Accordingly, in the case of the aged oxidation catalytic converter 6, the process of feeding current to the heating element 5 is started at time point t4, when the temperature drops below temperature T2'. The heating of the aged oxidation catalytic converter 6 by means of the electric heating element 5 is again ended at time point t7, with rising temperatures, at the characteristic temperature value T2a for the temperature of the oxidation catalytic converter 6 which is higher in comparison. Since in the case of an unaged oxidation catalytic converter 6, a catalytic activity is still present at lower temperatures, the oxidation catalytic converter 6 is heated by means of the heating element only for the shortened time interval between the time points indicated as t5 and t6, in which the unaged oxidation catalytic converter 6 is at a temperature below the characteristic temperature values T2 or T2'. Both in the case of an unaged and in the case of an aged oxidation catalytic converter 6, it is therefore possible to maintain an operational state by means of the electric heating element 5, even in adverse engine operating conditions. In this case, particularly when the temperature of the SCR catalytic converter 8 falls below the third characteristic temperature value T3, a late post-injection of fuel can be made additionally, as described above, and/or the center of combustion mass can be shifted to a late point.

The invention claimed is:
1. A method for adjusting a temperature of an exhaust gas after treatment device connected to an internal combustion engine having an electric heating element, an oxidation catalytic converter connected downstream of the electric heating element, and a selective catalytic reduction (SCR)

catalytic converter connected downstream of the oxidation catalytic converter, comprising the steps of:
- determining continuously temperature values for a current temperature of the oxidation catalytic converter and of the SCR catalytic converter;
- adjusting injection parameters of injection processes for fuel injections into combustion chambers of the internal combustion engine and a heat energy of the electric heating element according to the determined temperature values;
- assigning a characteristic temperature value which is assigned to a prespecified conversion threshold to the oxidation catalytic converter and the SCR catalytic converter;
- assigning a first characteristic temperature value for an oxidative carbon monoxide conversion and a second characteristic temperature value for an oxidative hydrocarbon conversion to the oxidation catalytic converter, and a third characteristic temperature value for a reductive NOx conversion to the SCR catalytic converter, wherein different respective values for the injection parameters and the heat energy are set upon reaching the first and the second characteristic temperature value and upon reaching the third characteristic temperature value; and
- operating the internal combustion engine and the electric heating element according to the set different respective values for the injection parameters and the heat energy.

2. The method according to claim 1, wherein a lower value is used for the first characteristic temperature value than for the second characteristic temperature value.

3. The method according to claim 1, wherein, for increasing temperatures, higher values are used for the first characteristic temperature value and for the second characteristic temperature value and the third characteristic temperature value than are used for decreasing temperatures.

4. The method according to claim 1, wherein a state of aging of the oxidation catalytic converter and the SCR catalytic converter is determined and wherein the first and the second and the third characteristic temperature value is modified according to the respectively determined aging state.

5. The method according to claim 1, wherein for heating of the oxidation catalytic converter and the SCR catalytic converter, a first heat energy is released as a result of operation of the electric heating element, a second heat energy is released according to the set injection parameters as a result of a late timing of fuel burnt in the combustion chambers of the internal combustion engine, and a third heat energy is released as a result of a post-combustion of incompletely combusted fuel discharged by the internal combustion engine at the oxidation catalytic converter, wherein a relative fraction of each heat energy is adjusted as part of a total heat energy resulting from the released heat energies, as a function of the determined temperature values and the first characteristic temperature value and the second characteristic temperature value and the third characteristic temperature value.

6. The method according to claim 5, wherein the total heat energy is only applied by the first heat energy and the second heat energy if, for the current temperature of the oxidation catalytic converter, the current temperature is below the first characteristic temperature value.

7. The method according to claim 5, wherein the relative fraction of the first heat energy is set to approximately 50% if, for the current temperature of the oxidation catalytic converter, the current temperature is below the first characteristic temperature value.

8. The method according to claim 5, wherein the relative fraction of the first heat energy is set to less than approximately 30% if, for the current temperature of the oxidation catalytic converter, the current temperature of the oxidation catalytic converter is above the first characteristic temperature value, and, for the current temperature of the SCR catalytic converter, the current temperature of the SCR catalytic converter is below the third characteristic temperature value.

9. method according to claim 5, wherein if the current temperature of the oxidation catalytic converter is below the first characteristic temperature value, the total heat energy is adjusted lower than if the current temperature of the oxidation catalytic converter is above the second characteristic temperature value, and if the current temperature of the SCR catalytic converter is below the third characteristic temperature value.

* * * * *